(12) United States Patent
Tomita et al.

(10) Patent No.: US 8,162,722 B2
(45) Date of Patent: Apr. 24, 2012

(54) GRINDSTONE CONTACT SENSING METHOD AND ITS DEVICE, AND HONING METHOD AND HONING MACHINE

(75) Inventors: Yasuo Tomita, Kyotango (JP); Takahiro Azuma, Kyotango (JP)

(73) Assignee: Nissin Manufacturing Co., Ltd., Kyoto (JP)

( * ) Notice: Subject to any disclaimer, the term of this patent is extended or adjusted under 35 U.S.C. 154(b) by 531 days.

(21) Appl. No.: 12/434,672

(22) Filed: May 3, 2009

(65) Prior Publication Data
US 2009/0291619 A1 Nov. 26, 2009

(30) Foreign Application Priority Data

May 22, 2008 (JP) ................................. 2008-133971

(51) Int. Cl.
*B24B 49/00* (2006.01)
(52) U.S. Cl. .................. 451/11; 451/27; 451/5; 451/26; 451/61; 451/180
(58) Field of Classification Search ................ 451/5, 11, 451/26, 41, 27, 61, 180
See application file for complete search history.

(56) References Cited

U.S. PATENT DOCUMENTS

| 4,095,377 | A | * | 6/1978 | Sugita | 451/22 |
| 4,505,074 | A | * | 3/1985 | Kogure | 451/5 |
| 4,637,169 | A | * | 1/1987 | Sigg | 451/11 |
| 4,666,352 | A | * | 5/1987 | Nagao et al. | 409/153 |
| 4,772,161 | A | * | 9/1988 | Nagao et al. | 409/148 |
| 4,791,759 | A | * | 12/1988 | Komata | 451/5 |
| 4,903,437 | A | * | 2/1990 | Kubotera et al. | 451/5 |
| 4,945,685 | A | * | 8/1990 | Kajitani et al. | 451/27 |
| 4,956,945 | A | * | 9/1990 | Ooshima | 451/1 |
| 4,984,351 | A | * | 1/1991 | Matsuyama et al. | 483/4 |
| 5,072,550 | A | * | 12/1991 | Matsumoto | 451/51 |
| 5,095,662 | A | * | 3/1992 | Grimm et al. | 451/5 |
| 5,177,904 | A | * | 1/1993 | Nagel et al. | 451/27 |
| 5,509,847 | A | * | 4/1996 | Jinno et al. | 451/11 |
| 6,475,073 | B2 | * | 11/2002 | Naoi | 451/180 |
| 6,669,532 | B1 | * | 12/2003 | Mukai et al. | 451/7 |
| 7,575,502 | B2 | * | 8/2009 | Cloutier et al. | 451/5 |
| 7,726,004 | B2 | * | 6/2010 | Ooe et al. | 29/563 |
| 2007/0229019 | A1 | * | 10/2007 | Iwashita et al. | 318/652 |
| 2009/0291619 | A1 | * | 11/2009 | Tomita et al. | 451/9 |
| 2010/0062692 | A1 | * | 3/2010 | Tomita et al. | 451/61 |

FOREIGN PATENT DOCUMENTS

JP 2005-262385 A 9/2005

* cited by examiner

*Primary Examiner* — George Nguyen
(74) *Attorney, Agent, or Firm* — Cheng Law Group, PLLC

(57) ABSTRACT

A grindstone contact sensing technology capable of sensing the contact position of the honing grindstone with the inner circumference of the work at high precision. A servo motor for driving the spindle rotation, and a servo motor for driving the depth of cut are provided and used respectively as spindle rotation drive source for rotating and driving the rotary spindle having the honing tool and depth-of-cut drive source for moving the honing grindstone at a specified depth of cut, and the contact position of the honing grindstone with the inner circumference of the work is sensed from various electrical information (rotating speed, torque, current value, stagnant pulses, etc.) obtained from the operations of both the servo motors.

15 Claims, 9 Drawing Sheets

GRINDSTONE CONTACT SENSING METHOD AND ITS DEVICE, AND HONING METHOD AND HONING MACHINE

BACKGROUND OF THE PRESENT INVENTION

1. Field of the Present Invention

The present invention relates to a grindstone contact sensing method and its device, and a honing method and honing machine, and more particularly to a grindstone depth-cutting technique suited to honing technology of honing a honing grindstone while positively depth-cutting into the inner circumference of a work, mechanically at a specific depth of cut.

2. Description of the Related Art

In various machine tools for cutting and grinding a workpiece (hereinafter called a work) by using machining tools, it is required to specify the relative positions of the machining tool with the work, especially the contact position accurately, in order to judge the timing and control the operation for positioning the machining tool on the work, or depth-cutting.

For this purpose, a contact type sensor such as touch probe, or contact-free type sensor such as AE (acoustic emission) sensor is provided near the machining tool, and a contact sensing device for detecting the contact position of the machining tool with the actual work is used (see, for example, Japanese Patent Application Laid-Open No. 2005-262385).

However, in the machine tool provided with such contact position sensing device, an independent device is needed in addition to the machining tool, and the structure of the entire machine tool is larger in size and is complicated.

Such configuration is not applied in a narrow space of machining of the work, because the installation space for the sensor or the sensing space is not available.

Especially, in the honing process of finishing the hole inner circumference of the work to a mirror-smooth surface, since the honing grindstone is inserted into the hole of the work, the machining space is very narrow, and the contact sensing device used in a conventional general machine tool cannot be employed.

In such circumstances, in the conventional honing process, regardless of the contact position of honing grindstone with work, the final expansion amount of the honing grindstone (final depth of cut) is determined, and generally the honing process is executed to reach the target of this final expansion amount.

Recently, in machining of a pair of parts for male-female fitting, while one part is finished, the other part is finished to match with the first part, which is known as matching process or aiming process, and this matching process is most expected in the honing process for finishing the hole inner circumference of the work.

In this matching process or match honing process of the honing process, the depth of cut is determined from the contact position of the honing grindstone with the work inner circumference, and the contact position of the honing grindstone with the work is the processing reference position, and it is essential to detect the contact position. In the high-precision honing where the required finish precision is in the sub-micron unit, the sensing precision of contact position is also required at high precision of sub-micron unit.

BRIEF SUMMARY OF THE PRESENT INVENTION

It is hence a primary object of the present invention to present a novel grindstone contact sensing technology solving the problems in the prior art.

It is other object of the present invention to present a grindstone contact sensing technology capable of sensing the contact position of the honing grindstone with the inner circumference of the work at high precision.

It is another object of the present invention to present a honing processing technology capable of shortening the processing cycle time and assuring a high finishing precision, by making use of the grindstone contact sensing technology mentioned above.

The grindstone contact sensing method of the present invention is a method of sensing the contact position of the honing grindstone with the inner circumference of the work in the process characterized by moving the honing tool provided with a honing grindstone reciprocally in the direction of the axial line of the inner circumference of the work, rotating about the axial line, moving the honing grindstone at a specified depth of cut by mechanical driving means, and honing the inner circumference of the work, in which a servo motor for driving the spindle rotation, and a servo motor for driving the depth of cut are provided and used respectively as spindle rotation drive source for rotating and driving the rotary spindle having the honing grindstone and depth-of-cut drive source for moving the honing grindstone at a specified depth of cut, and the contact position of the honing grindstone with the inner circumference of the work is sensed from various electrical information obtained from the operations of both the servo motors.

The following configurations are presented as preferred embodiments.

(1) The method includes (a) a rapid expansion process for moving the honing grindstone rapidly at a predetermined depth of cut by the servo motor for driving the depth of cut, while rotating the honing tool by the servo motor for driving the spindle rotation, (b) a preliminary contact sensing process, following the rapid expansion process, for moving the honing grindstone at a depth of cut at a predetermined medium speed by the servo motor for driving the depth of cut, and sensing the contact state of the honing grindstone with the inner circumference of the work from various electrical information obtained from operations of the servo motor for driving the spindle rotation and the servo motor for driving the depth of cut, at preliminary contact sensitivity of high precision, and (c) a final contact sensing process, following the preliminary contact sensing process, for moving the honing grindstone at a depth of cut at a predetermined low speed by the servo motor for driving the depth of cut, and sensing the contact state of the honing grindstone with the inner circumference of the work from various electrical information obtained from operations of the servo motor for driving the spindle rotation and the servo motor for driving the depth of cut, at final contact sensitivity lower than the preliminary contact sensitivity.

(2) The electrical information in the preliminary contact sensing process and the final contact sensing process includes at least the spindle current value and spindle rotating speed of the servo motor for driving the spindle rotation and the expansion current value of the servo motor for driving the depth of cut.

The honing processing method of the present invention is a method of honing the inner circumference of the work by moving the honing tool provided with a honing grindstone reciprocally in the direction of the axial line of the inner circumference of the work, rotating about the axial line, moving the honing grindstone at a specified depth of cut by mechanical driving means, and honing the inner circumference of the work, in which the contact position of the honing grindstone with the inner circumference of the work is sensed by the grindstone contact sensing method, and on the basis of this contact position, the inner circumference of the work is honed while controlling the depth of cut of the honing grindstone.

The following configurations are presented as preferred embodiments.

(1) The method includes (a) a processing start process for moving the honing tool by strokes to a stroke position for sensing the contact of the honing grindstone with the work, (b) a grindstone contact sensing process, following the processing start process, for executing the grindstone contact sensing method, and (c) a honing process, following the grindstone contact sensing process, for moving the rotating honing grindstone in reciprocal strokes in the direction of axial line of the inner circumference of the work, controlling the depth of cut of the honing grindstone on the basis of the contact position of the honing grindstone detected at the grindstone contact sensing process, and honing the inner circumference of the work by the honing grindstone.

The grindstone contact sensing device of the present invention is installed in a honing machine for moving the honing tool provided with a honing grindstone reciprocally in the direction of the axial line of the inner circumference of the work, rotating about the axial line, moving the honing grindstone at a specified depth of cut by mechanical driving means, and honing the inner circumference of the work, for sensing the contact of the honing grindstone with the inner circumference of the work, including a servo motor for driving the spindle rotation for rotating and driving the rotary spindle having the honing tool, a servo motor for driving the depth of cut for moving the honing grindstone at a depth of cut, and contact sensing means for monitoring various electrical information obtained from the operations of both the servo motor, and sensing the contact position of the grindingstone with the inner circumference of the work from the monitoring result, in which the contact sensing means is designed to execute the grindstone contact sensing method of the present invention.

A preferred embodiment includes monitoring information setting means for selecting and setting the electrical information to be monitored by the contact sensing means, from plural types of electrical information of the servo motor, and the electrical information includes at least the spindle current value and spindle rotating speed of the servo motor for driving the spindle rotation, and the expansion current value of the servo motor for driving the depth of cut.

The honing machine of the present invention includes a rotary spindle movable reciprocally in the direction of axial line of the inner circumference of the work, and supported rotatably about the axial line, spindle rotating means for rotating and driving the rotary spindle about the axial line, spindle reciprocating means for moving the rotary spindle reciprocally in the direction of axial line of the inner circumference, a honing tool attached to the leading end of the rotary spindle, and expansively having a honing grindstone having a grinding surface along the inner circumference, grindstone depth-cutting means for moving the honing grindstone of the honing tool at a specified depth of cut, grindstone contact sensing means for sensing the contact of the honing grindstone with the inner circumference of the work, and control means for controlling automatically by mutually interlocking the operations of the spindle rotating means, spindle reciprocating means and grindstone depth-cutting means, in which the grindstone contact sensing means is composed of any one of the grindstone contact sensing device as set forth in any one of claims 6 to 8.

(1) According to the grindstone contact sensing method of the present invention, a servo motor for driving the spindle rotation, and a servo motor for driving the depth of cut are provided and used respectively as spindle rotation drive source for rotating and driving the rotary spindle having the honing tool and depth-of-cut drive source for moving the honing grindstone at a specified depth of cut, and the contact position of the honing grindstone of the honing tool with the inner circumference of the work is sensed from various electrical information obtained from both the servo motors, and therefore the contact position of the honing grindstone with the inner circumference of the work can be sensed at high precision.

That is, according to this grindstone contact sensing method, unlike the conventional similar sensing technology, the contact of the grindingstone with the work can be sensed without newly adding a device or correcting the basic mechanical configuration.

In particular, in honing process in an extremely narrow space in which the honing grindstone is inserted in the hole of the work, the contact of the honing grindstone with the inner circumference of the work can be sensed, which was conventionally difficult or impossible.

As a result, the present invention realizes the matching process (aiming process) or match honing process that is most expected recently in the honing technical field (that is, the honing processing method for cutting how much from the contact position of the honing grindstone abutting with the inner circumference of the work).

(2) Further, the grindstone contact sensing method is composed of three steps, that is, (a) a rapid expansion process for moving the honing grindstone rapidly at a predetermined depth of cut by the servo motor for driving the depth of cut, while rotating the honing tool by the servo motor for driving the spindle rotation (step 1), (b) a preliminary contact sensing process, following the rapid expansion process, for moving the honing grindstone at a depth of cut at a predetermined medium speed by the servo motor for driving the depth of cut, and sensing the contact state of the honing grindstone with the inner circumference of the work from various electrical information (rotating speed, torque, current value, stagnant pulses, etc.) obtained from operations of the servo motor for driving the spindle rotation and the servo motor for driving the depth of cut, at preliminary contact sensitivity of high precision (step 2), and (c) a final contact sensing process, following the preliminary contact sensing process, for moving the honing grindstone at a depth of cut at a predetermined low speed by the servo motor for driving the depth of cut, and sensing the contact state of the honing grindstone with the inner circumference of the work from various electrical information (rotating speed, torque, current value, stagnant pulses, etc.) obtained from operations of the servo motor for driving the spindle rotation and the servo motor for driving the depth of cut, at final contact sensitivity lower than the preliminary contact sensitivity (step 3), and therefore the contact of the honing grindstone with the inner circumference of the work can sensed at a very high precision In the high-precision honing process where the required finish precision is in the sub-micron unit, the contact position can be sensed also at high precision in sub-micron unit, and match honing process of high precision is realized.

(3) Also according to the grindstone contact sensing method of the present invention, the grindstone projection adjustment, which was done manually in an early stage after replacing the honing grindstone of the honing tool in the prior art, can be done automatically.

That is, in the honing machine, when the honing grindstone of the honing tool is worn out over a specified limit, it is replaced with a new honing grindstone, and when replacing the honing grindstone, the initial grindstone projection is adjusted, and the reference position of the depth of cut of the honing grindstone must be set and adjusted.

Conventionally, the grindstone projection was adjusted manually by a skilled worker by manipulating the grindstone projection adjusting handle, and the precision of adjustment depended on the skill and experience of the worker (the sense to detect contact of the honing grindstone with the reference setting work).

According to the grindstone contact sensing method of the present invention, the grindstone projection can be adjusted automatically by the operation of the honing machine, and not depending on the skill and experience of the worker, the grindstone projection can be adjusted precisely and stably.

(4) Also according to the grindstone contact sensing method of the present invention, the conventional manual truing operation of the honing grindstone can be done automatically.

That is, the honing grindstone is used and worn, and deformed, and run-out from the rotary spindle occurs or the cylindricity is lowered, and correction is needed at specific intervals, which is known as truing, and conventionally the truing was manually practiced by a skilled worker by using truing jigs, such as truing block and truing sleeve, that is, the honing tool is inserted into the truing jig with the honing grindstone projected somewhat, and the grinding surface of the honing grindstone is polished while abutting against the truing surface, and same as in the grindstone projection adjustment, the truing precision depended on the skill and experience of the worker.

According to the grindstone contact sensing method of the present invention, the truing jig, for example, the truing sleeve is held in the honing machine, instead of the work, and the projection of the honing grindstone and rotation operation can be adjusted automatically by mechanical operation of the honing machine, and truing of high precision is executed stably and quickly without depending on the skill and experience of the worker.

(5) According to the honing processing method of the present invention, the contact position of the honing grindstone with the inner circumference of the work is detected by the grindstone contact sensing method, and by reference to this contact position, the inner circumference of the work is honed while controlling the depth of cut of the honing grindstone, and the match honing process can be executed efficiently.

Moreover, in the starting stage of the honing processing method, the grindstone contact sensing method includes three steps, that is, at step 1, the honing tool is rotated by the servo motor for driving the spindle rotation, and the honing grindstone is moved rapidly at a predetermined depth of cut by the servo motor for driving the depth of cut, and by the action of the rapid expansion process for moving by the depth of cut, the idle time of the honing grindstone not processing the work, that is, the air-cut time can be shortened, and the cycle time in one cycle of honing process can be shortened.

(6) Further, according to the grindstone contact sensing device and the honing machine of the present invention applying the grindstone contact sensing technology mentioned above, the above effects are exhibited effectively, and the basic mechanical configuration of the conventional general honing machine can be directly utilized, and the honing machine capable of operating match honing process can be presented at low cost.

The other objects and features of the present invention will be clarified by reading the following detailed description together with the accompanying drawings and the novel facts disclosed in the claims herein.

DETAILED DESCRIPTION OF THE PREFERRED EMBODIMENT

Figure 1:
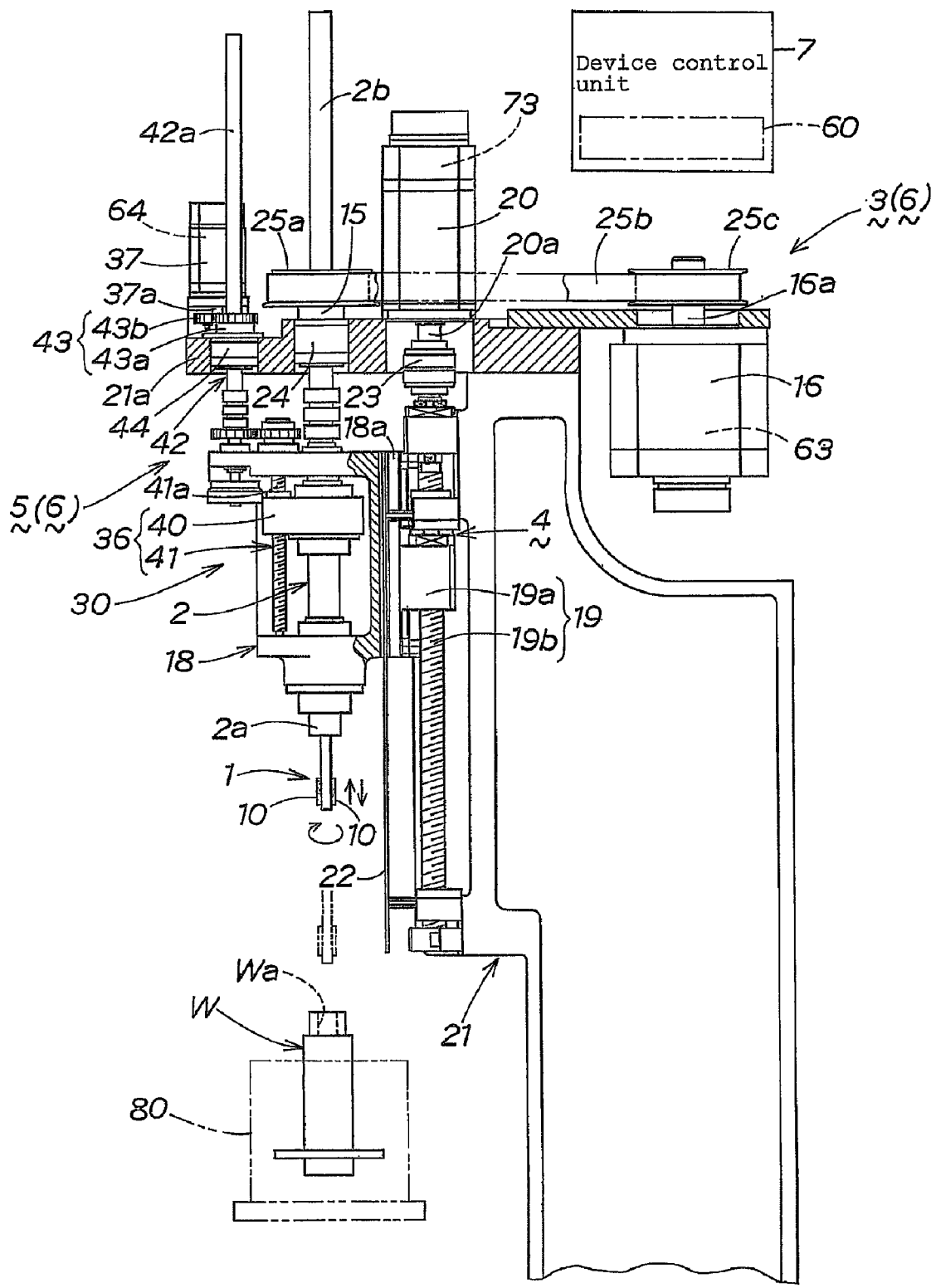
FIG. 1 is a front view of a partial section of outline configuration of a honing machine in a preferred embodiment of the present invention.

A preferred embodiment of the present invention is specifically described below.

FIG. 1 to FIG. 8 show the grindstone contact sensing technology of the present invention, and throughout the drawings, same reference numerals refer to same constituent members or elements.

The honing machine of the present invention is shown in FIG. 1, and this honing machine is a vertical type for machining the inner circumference Wa of a cylindrical hole of a work W, and is mainly composed of a rotary spindle 2 having a honing tool 1 at the leading end, a spindle rotation drive unit (spindle rotating means) 3, a spindle reciprocal drive unit (spindle reciprocating means) 4, a grindstone depth-cutting unit (grindstone depth-cutting means) 5, a grindstone contact sensing unit (grindstone contact sensing means) 6, and a device control unit (control means) 7.

The honing tool (so-called honing head) 1 is detachably mounted on the leading end of the rotary spindle 2, that is, at a lower end 2a.

Figure 2:
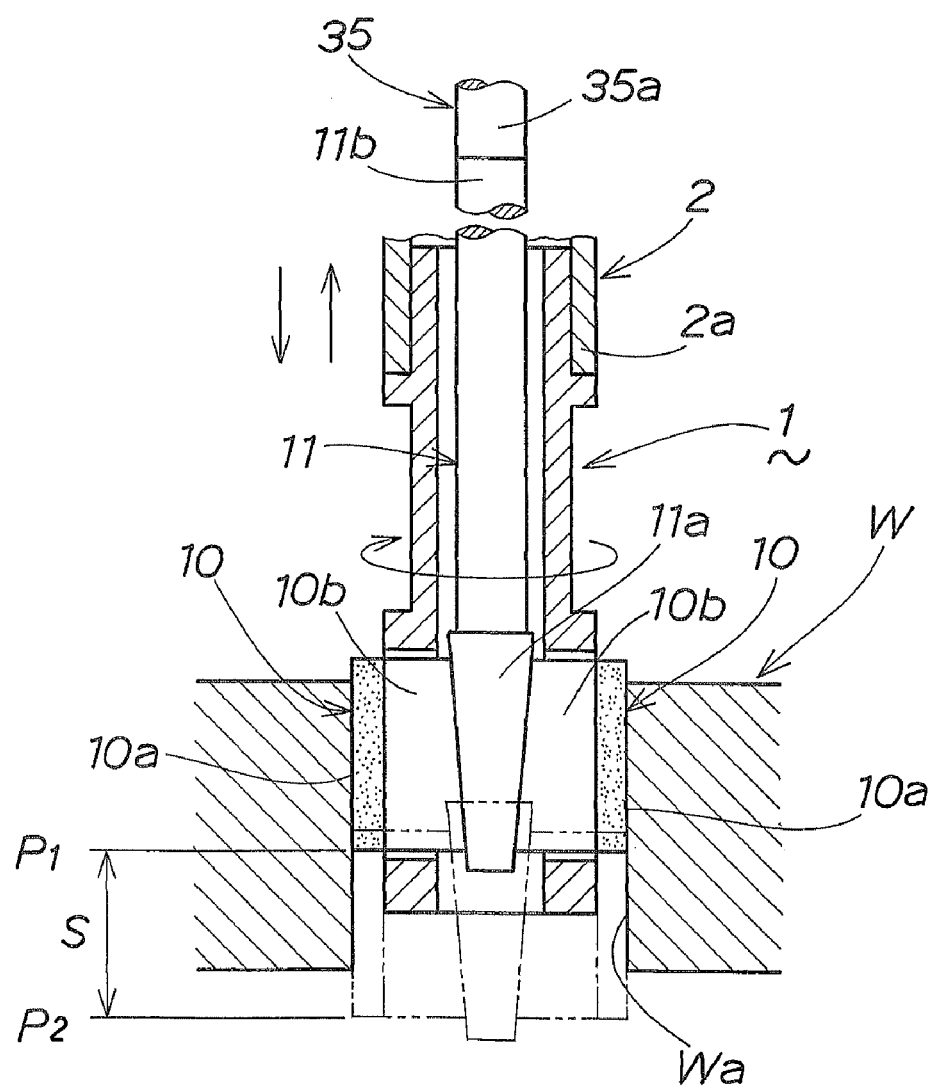
FIG. 2 is a magnified front sectional view of processing state of work inner circumference by a honing grindstone of the honing machine.

The inside of the honing tool 1 includes, as shown in FIG. 2, a plurality of honing grindstones 10, 10, . . . , disposed so as to be expandable in the direction of diameter, a cone rod 11 for expanding these honing grindstones 10, 10, . . . , and a return spring (not shown) for returning the honing grindstones 10, 10, . . . .

Each honing grindstone 10 has a grinding surface 10a along the inner circumference Wa of the work W. The cone rod 11 is disposed in the honing tool 1 movably in vertical direction, and its leading end wedge 11a is a grindstone expanding part for pressing a grinding stone stand 10b of each honing grindstone 10, and its upper part, a base rod 11b is coupled to a grindstone expanding rod 35 mentioned later. Although not shown in the drawings, the honing grindstones 10, 10, . . . are elastically forced always in the contracting direction by the return spring.

Thus, the honing grindstones 10, 10, . . . are expanded by the downward motion of the cone rod 11, and contracted by the return spring by the upward motion of the cone rod 11.

The rotary spindle 2 has the honing tool 1 provided at its lower end, and is coupled to the spindle rotation drive unit 3 including a drive shaft 15, power transmission units 25a to 25c, a drive motor 16, and others, and to the spindle reciprocal drive unit 4 including a slide main body 18, a feed screw mechanism 19, a drive motor 20, and others.

That is, the rotary spindle 2 is rotatably supported by the slide main body 18, and the slide main body 18 is elevated and guided by a guide rail 22, and is driven by and coupled to the elevating drive source, that is, the feed screw mechanism 19 and drive motor 20.

The guide rail 22 is extended on a machine body 21 linearly in vertical direction, and a slide part 18a of the slide main body 18 is guided and supported slidably on the guide rail 22. In the slide part 18a of the slide main body 18, a nut body 19a of the feed screw mechanism 19 is integrally coupled and fixed, and this nut body 19a extended perpendicularly in the vertical direction of the machine body 21, and is engaged with a feed screw 19b supported rotatably to be movable back and forth in the vertical direction by way of a coupling 23. The upper end of the feed screw 19b is driven by and coupled to a motor shaft 20a of the drive motor 20. The drive motor 20 is a servo motor having a built-in position detection sensor 73 such as rotary encoder, and the amount of rotation of the drive motor 20 is detected by the position detection sensor 73.

When the motor shaft 20a of the drive motor 20 is driven, the feed screw 19b of the ball screw mechanism 19 is rotated, and the slide main body 18 integrated with the nut body 21b is moved in vertical direction, and the rotary spindle 2, that is, the honing tool 1 is moved up and down through the slide main body 18.

The upper end 2b of the rotary spindle 2 is spline-fitted to the drive shaft 15 provided rotatably on the head 21a of the machine body 21, and is coupled to the drive shaft 15 relatively movably in the vertical direction (axial line direction) and rotatably integrally.

More specifically, the upper end 2b of the rotary spindle 2 is supported on the head 21a of the machine body 21 slidably in vertical direction by means of a rotary spline device 24, and is connected rotatably to the spindle drive shaft 15 coaxially and integrally.

The drive shaft 15 has a transmission pulley 25a, and this transmission pulley 25a is coupled to a transmission pulley 25c mounted on the motor shaft 16a of the drive motor 16 by way of a transmission belt 25b. This drive motor 16 is a principal component of the grindstone contact sensing unit 6, and a servo motor is used. In the drive motor 16, a position detection sensor 63 such as rotary encoder is integrally incorporated, and the rotation amount of the drive motor 16 is detected by this position detection sensor 63. By rotating and driving of the drive motor 16, the rotary spindle 2, that is, the honing tool 1 is rotated and driven by way of the drive shaft 15.

Figure 5:
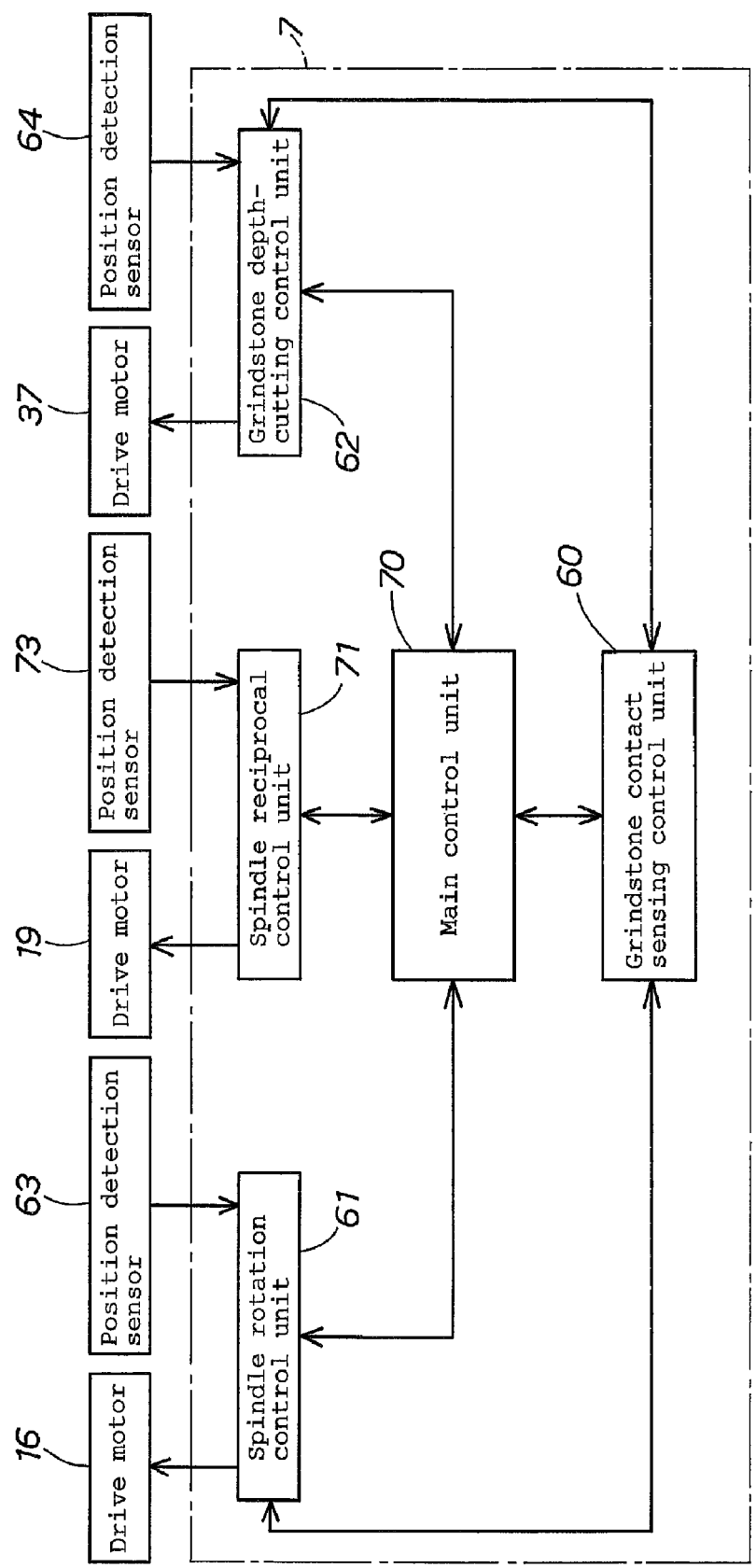
FIG. 5 is a block diagram of configuration of a device control unit of the honing machine.

The grindstone depth-cutting unit 5 is designed to move the honing grindstones 10, 10, . . . , at a specified depth of cut, and is mainly composed of a grindstone depth-cutting drive unit (depth-cutting driving means) 30 and a grindstone depth-cutting control unit (depth-cutting control means) 62 as shown in FIG. 1 and FIG. 5.

The grindstone depth-of-cut drive unit 30 moves the honing grindstones 10, 10, . . . at a specified depth of cut mechanically, and specifically includes the cone rod 11 (FIG. 2) of the honing tool 1, the grindstone extension rod 35 (FIG. 2), the depth-of-cut drive mechanism 36, the drive motor 37, and others.

The grindstone extension rod 35 is not specifically shown in the drawing, but is provided movably in the axial line direction (vertical direction) within the shaft hole formed in the latter half of the rotary spindle 2, and its lower end 35a is coupled to a base rod 11b of the cone rod 11 (see FIG. 2), and its upper end 35b is coupled to the depth-of-cut drive mechanism 36.

The depth-of-cut drive mechanism 36 is designed to move the grindstone extension rod 35 in the vertical direction (axial line direction), and is mainly composed of a driven element 40 coupled to the grindstone extension rod 35, and a drive screw shaft member 41 for moving this driven member 40 vertically, same as in the prior art.

The driven member 40 is provided on the rotary spindle 2 slidably in vertical direction relatively, and is integrally coupled to the grindstone extension rod 35 disposed in the rotary spindle 2 in the vertical direction.

The driven member 40 is engaged with the drive screw shaft member 41 movably back and forth in the vertical direction by way of a female thread member (not shown) fixed integrally thereto. This drive screw shaft member 41 is supported on the slide main body 18 rotatably in parallel to the rotary spindle 2.

The drive screw shaft member 41 is coupled to a depth-of-cut drive shaft 42 provided rotatably on the head 21a of the machine body 21. Specifically, this depth-of-cut drive shaft 42 is supported in parallel to the drive screw shaft member 41, and its upper end 42a is spline-fitted to a rotary gear shaft 43a of a gear mechanism 43 provided rotatably on the head 21a of the machine body 21, and is coupled integrally and rotatably to the rotary gear mechanism 43a so as to be movable relative in the vertical direction.

Specifically, the upper end 42a of the depth-of-cut drive shaft 42 is supported by a rotary spline device 44 slidably in vertical direction on the head 21a of the machine body 21, and is connected to the rotary gear shaft 43a coaxially and rotatably together. The rotary gear shaft 43a is engaged with a gear 43b, and this gear 43b is integrally attached and fixed to the motor shaft 37a of the drive motor 37. On the other hand, the drive shaft 42 is driven by and coupled to the upper end 41a of the drive screw shaft member 41 by way of a gear mechanism 44.

The drive motor 37 is a principal component of the grindstone contact sensing unit 6, same as the drive motor 16 of the spindle rotation drive unit 3, and a servo motor is used. In this drive motor 37, a position detection sensor 64 such as rotary encoder is integrally incorporated, and the rotation amount of the drive motor 37 is detected by this position detection sensor 64.

By rotation and driving of the motor shaft 37a of the drive motor 37, when the depth-of-cut drive shaft 42 rotates, the drive screw shaft member 41 is put in rotation, and the driven element 40 engaged therewith movably back and forth is relatively moved up or down to the rotary spindle 2. That is, when the driven member 40 is moved down, the grindstone extension rod 35 provided integrally therewith pushes the cone rod 11 downward, and the honing grindstones 10, 10, . . . are extended. On the other hand, when the driven element 40 moves upward, along with the upward move of the grindstone extension rod 35, the honing grindstones 10, 10, . . . are contracted by the return spring (not shown) in the honing tool 1.

The grindstone contact sensing unit (grindstone contact sensing means, grindstone contact sensing device) 6 is for sensing the contact of honing grindstones 10, 10, . . . , with the inner circumference Wa of the work W, and specifically monitors various electrical information (rotating speed, torque, current value, stagnant pulses, etc.) obtained from the operation of the drive motors 16 and 37 of the spindle rotation drive unit 3 and the grindstone depth-cutting unit 5, and senses the contact position of the honing grindstones 10, 10, . . . of the honing tool 1 with the inner circumference Wa of the work W from the results of monitoring, and is mainly composed of the spindle rotation drive unit 3, the grindstone depth-cutting unit 5, and the grindstone contact sensing control unit 60.

For this purpose, both the drive motors 16 and 37 are composed of servo motors.

The grindstone contact sensing control unit 60 in the illustrated preferred embodiment monitors various electrical information obtained from the operations of the servo motor 16 for driving the spindle rotation of the spindle rotation drive source 3 and the servo motor 37 for driving the depth of cut of the grindstone depth-cutting unit 5, and drives and controls the servo motors 16, 37 in mutual cooperation, and compose a part of the device control unit 7 described below (see FIG. 5).

Figure 3:
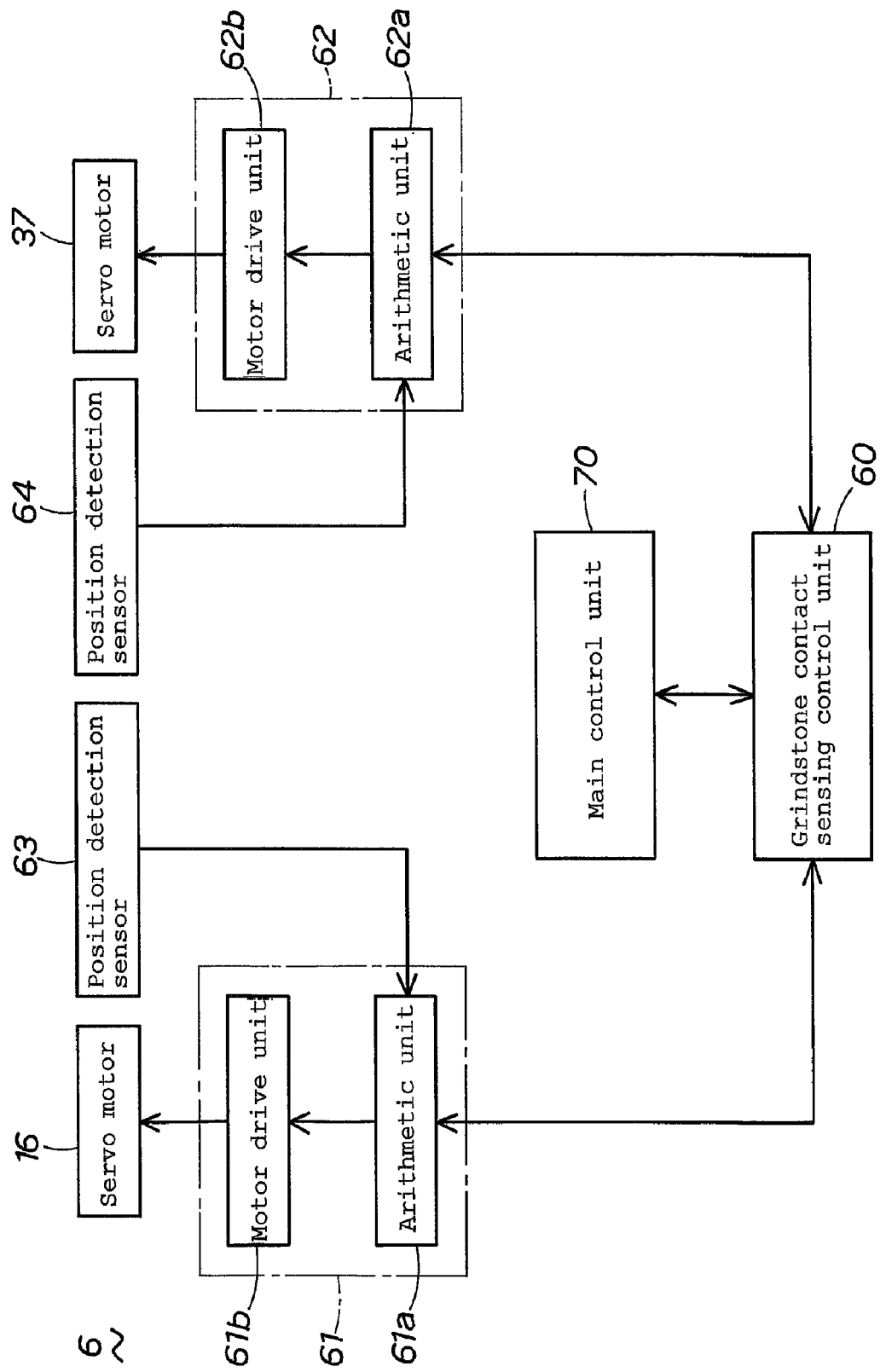
FIG. 3 is a block diagram of configuration of a grindstone contact sensing unit of the honing machine.

That is, as shown in FIG. 3, the grindstone contact sensing control unit 60 receives a command from a main control unit 70 described below, and rotates and drives the servo motor 16 for driving the spindle rotation and the servo motor 37 for driving the depth of cut by way of the spindle rotation control unit 61 and the grindstone depth-cutting control unit 62, and executes the grindstone contact sensing process (grindstone contact sensing method) as mentioned below.

The spindle rotation control unit 61 is, as shown in FIG. 3, a servo amplifier composed of an arithmetic unit 61*a* and a motor drive unit 61*b*, and a detection signal from the position detection sensor 63 such as rotary encoder for detecting the rotating speed of the rotary spindle 2, that is, the motor shaft 16*a* of the drive motor 16 is entered into the arithmetic unit 61*a* by feedback, and this arithmetic unit 61*a* compares the entered the detection value (rotating speed) with the command value (rotating speed) from the grindstone contact sensing control unit 60, and on the basis of the calculation result, an electric power proportional to the error of the detection value and the command value is supplied to the drive motor 16 so as to match the detection value and the command value.

Similarly, the grindstone depth-cutting control unit 62 is, as shown in FIG. 3, a servo amplifier composed of an arithmetic unit 62*a* and a motor drive unit 62*b*, and a detection signal from the position detection sensor 64 such as rotary encoder for detecting the rotating speed of the depth-cutting drive shaft 42, that is, the motor shaft 37*a* of the drive motor 37 is entered into the arithmetic unit 62*a* by feedback, and this arithmetic unit 62*a* compares the entered the detection value (rotating speed) with the command value (rotating speed) from the grindstone contact sensing control unit 60, and on the basis of the calculation result, an electric power proportional to the error of the detection value and the command value is supplied to the drive motor 37 so as to match the detection value and the command value.

The grindstone contact sensing control unit 60 rotates and controls the servo motor for driving the spindle rotation 16 and the servo motor for driving the depth of cut 37, and monitors various electrical information obtained from the operations of these servo motors 16 and 37, and compares the monitoring result and the preset values of electrical information, and judges and senses the contact of the honing grindstones 10, 10, . . . with the inner circumference Wa of the work W on the basis of the comparison result.

Figure 4:
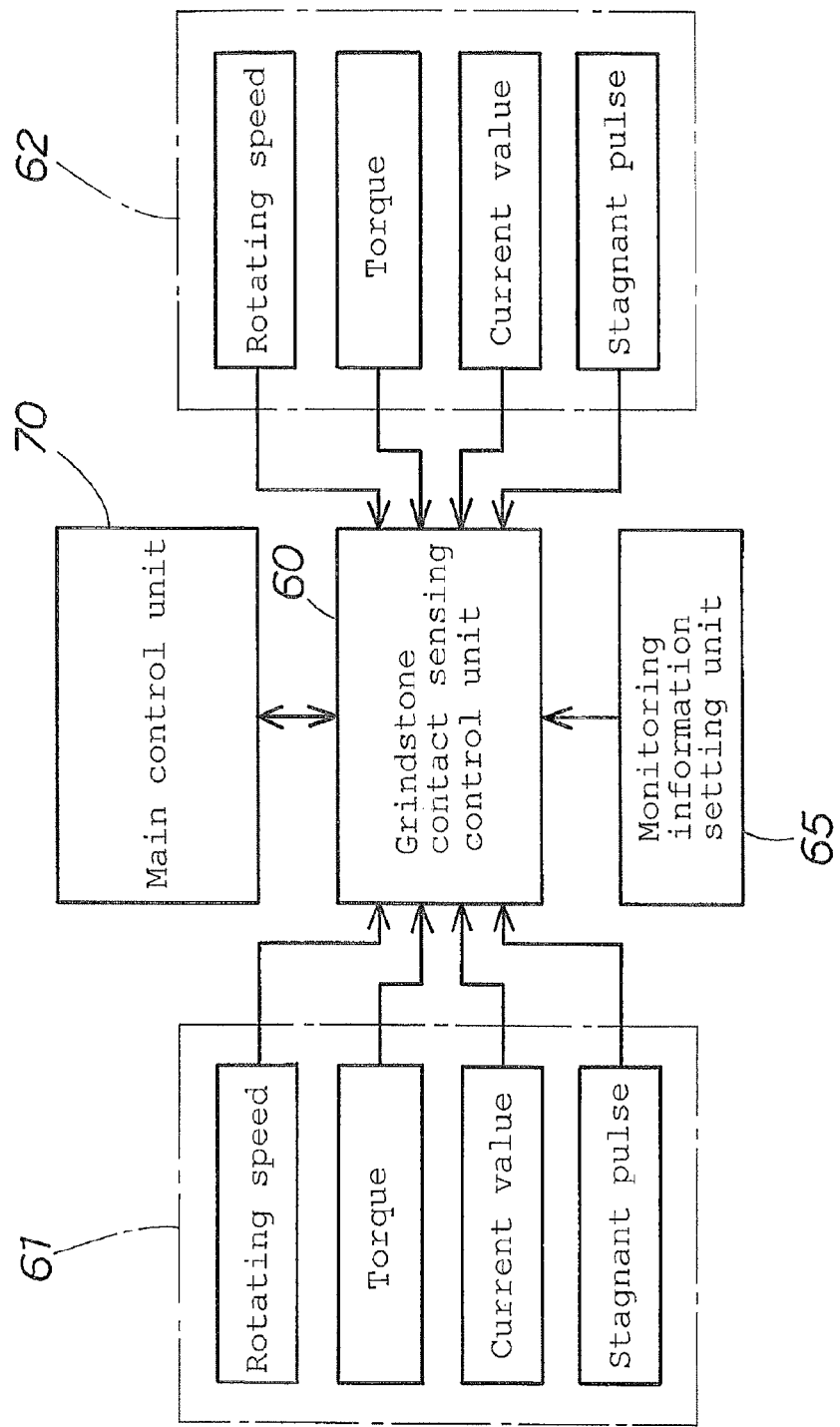
FIG. 4 is a block diagram of various electrical information monitored by a grindstone contact sensing control unit of the grindstone contact sensing part.

The electrical information for judging the contact obtained from the operations of the servo motors 16 and 37 include, in the case of the illustrated preferred embodiment as shown in FIG. 4, the rotating speed, torque, current value, and stagnant pulses of the servo motors 16 and 37, that is, four items of information each, and a total of eight items of electrical information can be used, and the electrical information is obtained from the servo amplifiers for composing the spindle rotation control unit 61 and the grindstone depth-of-cut control unit 62.

All of the electrical information is not always utilized for judging the contact, but may be properly selected and utilized depending on the material of the work W to be processed, shape and dimensions such as diameter of processing, specification of the honing tool 1 (tool diameter, tool type, type of grindstone, shape and dimensions, etc.), and other operating conditions. For this purpose, a monitor information setting unit (monitor information setting means) 65 is provided for selecting and setting the electrical information to be monitored by the grindstone contact sensing unit 6, from plural types of electrical information (eight types in the shown example) of the servo motors 16, 37.

The grindstone contact sensing process (grindstone contact sensing method) to be executed by the grindstone contact sensing control unit 60 includes initial stages of the honing processing process (honing processing method) mentioned below, that is, from the processing operation start to the grindstone contact detection (see FIG. 8), and specifically consists of three steps as described below.

Figure 6:
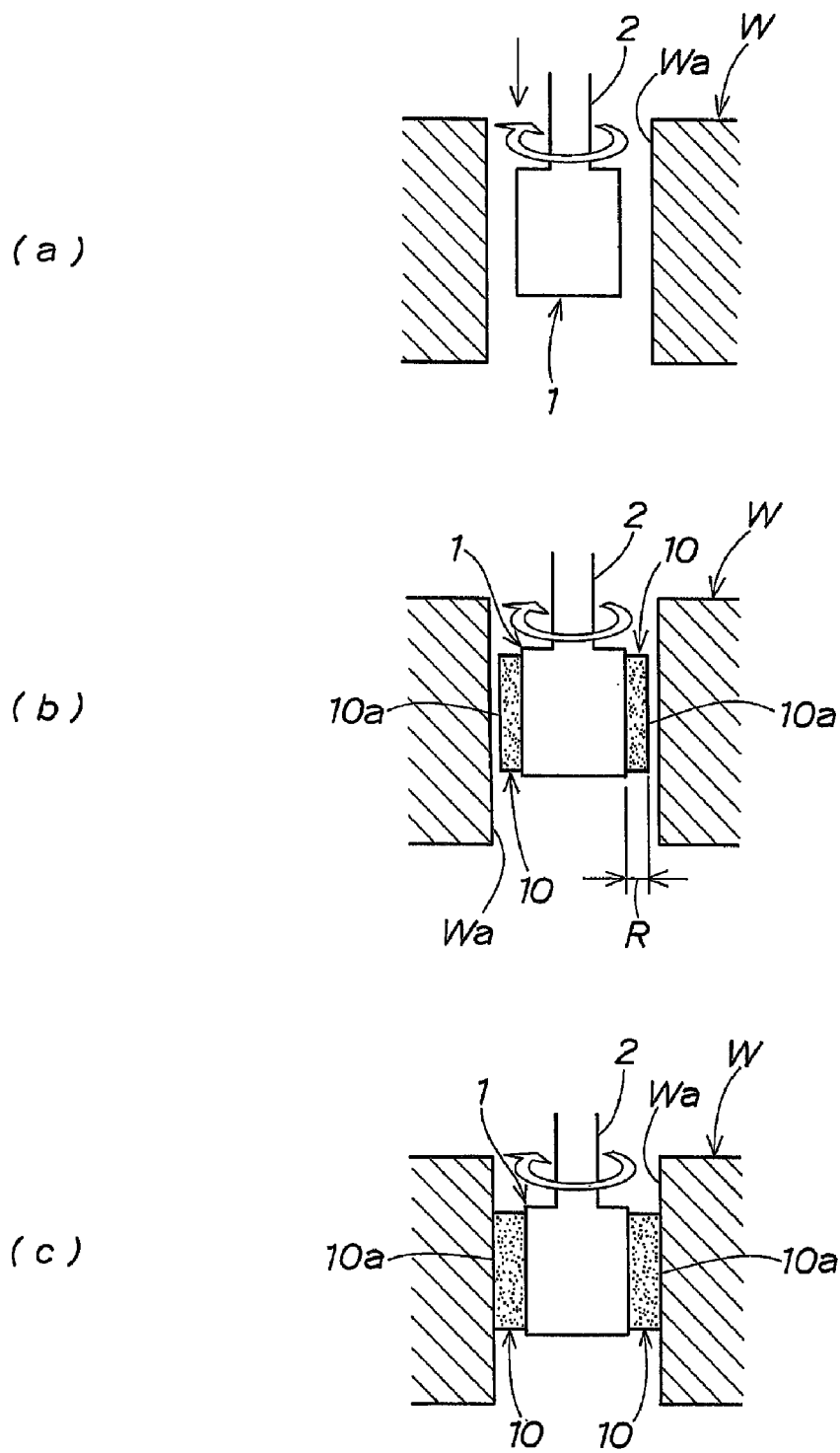
FIG. 6 is a schematic diagram for explaining the contact sensing operation of the grindstone contact sensing unit.

The grindstone contact sensing process consists of three steps in order to shorten the time from the processing operation start until the grindstone contact detection while realizing contact sensing of high precision, which is achieved after various tests and studies by the present inventors. In the grindstone contact sensing process consisting of three steps, step 1 and step 2 are intended to shorten the process time, and step 3 is intended to raise the sensing precision. Referring now to FIG. 6, each step is described specifically.

(A) Rapid Expansion Process (Step 1)

While rotating the honing tool 1 by the servo motor for driving the spindle rotation 16, the honing grindstones 10, 10, . . . are moved rapidly to a predetermined depth of cut by the servo motor for driving the depth of cut 37 (FIG. 6 (*a*) to (*b*)).

In this case, the depth of cut R in rapid expansion process is equal to the expansion not allowing contact between the honing grindstones 10, 10 and the inner circumference Wa of the work W, which is known from the design of the honing machine, and they are rapidly moved to this position of expansion position.

Specifically, the range of expansion amount of the honing grindstones 10, 10, . . . from the origin of depth-of-cut (expansion) (for example, the position of the grinding surface 10*a* of the honing grindstone 10 stored inside the honing tool 1) until contacting with the work W is determined by the tolerance between the machine specification and the under-hole of the work W, from the design of the machine (honing machine). The maximum value of the range of expansion amount of the honing grindstone 10 is set as the depth of cut R in the rapid expansion process, and it is designed to move rapidly to a specified depth of cut up to this maximum expansion position. Incidentally, if the grinding surfaces 10*a*, 10*a*, . . . of the honing grindstones 10, 10, . . . are rapidly expanded up to the position contacting with the inner circumference Wa of the work W, the honing grindstones 10, 10, . . . may contact with the work W.

(B) Preliminary Contact Sensing Process (Step 2)

After the rapid expansion process, the servo motor for driving the depth of cut 37 moves the honing grindstones 10, 10, . . . at a preset medium speed to a specified depth of cut, and by the electrical information obtained from the operations of the servo motor for driving the spindle rotation 16 and the servo motor for driving the depth of cut 37, the contact state of the grinding surfaces 10a, 10a, . . . of the honing grindstones 10, 10, . . . with the inner circumference Wa of the work W is sensed at the preliminary contact sensitivity of high precision (FIGS. 6 (b) to (c)

That is, it is designed to expand at a proper expansion speed (as fast as possible) not to be caught if the grinding surfaces 10a, 10a, . . . of the honing grindstones 10, 10, . . . contact with the inner circumference Wa of the work W. At this time, by setting so that the contact between the grinding surfaces 10a, 10a, . . . of the honing grindstones 10, 10, . . . and the inner circumference Wa of the work W may be sensed sensitively (preliminary contact sensitivity), according to the various electrical information obtained from the operations of the servo motor for driving the spindle rotation 16 and the servo motor for driving the depth of cut 37, the contact or non-contact state of the grinding surfaces 10a, 10a, . . . of the honing grindstones 10, 10, . . . with the inner circumference Wa of the work W can be monitored and analyzed.

In the illustrated preferred embodiment, the electrical information includes the expansion current obtained from the operation of the servo motor for driving the depth of cut 37, and the spindle current and spindle rotating speed obtained from the operation of the servo motor for driving the spindle rotation 16, which may be monitored and analyze selectively. These three times of electrical information are selected owing to the following reasons.

That is, in consideration of the configuration of the machine, between the servo motor for driving the depth of cut 37 and the honing grindstones 10, 10, . . . , various components are disposed, such as a gear mechanism 43, a depth-cutting drive shaft 42, a gear mechanism 44, a drive screw shaft member 41, a driven element 40, and a leading end wedge 11a of a cone rod 11, and a dead zone (lost motion) is formed due to deflection of such components. By using the gear mechanisms 43, 44 and the leading end wedge 11a, the torque of the servo motor for driving the depth of cut 37 is transformed into a very large force, and the honing grindstones 10, 10, . . . are projected. Hence, the torque change is very dull, and preliminary contact position detection of high precision is hardly realized only by control or monitor of the servo motor for driving the depth of cut 37.

On the other hand, the rotary spindle 2 only transmits the driving force of the servo motor for driving the spindle rotation 16 through the transmission belt 25b using a timing belt, and the change in the torque and rotating speed can be detected very easily by the servo motor 16 as compared with the depth-cutting drive shaft 42.

Because of these reasons, in the preferred embodiment, the three items of electrical information are selected, that is, the expansion current obtained from the operation of the servo motor for driving the depth of cut 37, and the spindle current and spindle rotating speed obtained from the operation of the servo motor for driving the spindle rotation 16.

When the grinding surfaces 10a, 10a, . . . of the honing grindstones 10, 10, . . . contact with the inner circumference Wa of the work W, a friction occurs between the honing grindstones 10, 10, . . . and the work W, and a load is applied to rotating operation of the rotary spindle 2, and when loaded, in order to maintain the rotation of the rotary spindle 2, the current value of the spindle current of the servo motor for driving the spindle rotation 16 is elevated. By limiting the maximum torque of the rotary spindle 2, when a load larger than a specific torque is applied, the current value is no longer elevated, and hence the rotating speed of the rotary spindle 2 (spindle rotating speed) is lowered.

Therefore, by monitoring the change of the servo motor for driving the spindle rotation 16, by checking the change of spindle current and spindle rotating speed, the preliminary contact position detection of high precision is realized. In this case, the preliminary contact position is determined either by judging comprehensively when all items of electrical information to be monitored (expansion current obtained from the operation of the servo motor for driving the depth of cut 37, and spindle current and spindle rotating speed obtained from the operation of the servo motor for driving the spindle rotation 16) reach predetermined set values, or by judging when any one of the electrical information reaches the set value, depending on and in consideration of operation conditions such as the material of the work W to be processed, shape and dimensions such as diameter of processing, and specification of the honing tool 1 (tool diameter, tool type, type of grindstone, shape and dimension, etc.), which can be determined experimentally.

In this preliminary contact sensing process, the grinding surfaces 10a, 10a, . . . of the honing grindstones 10, 10, . . . contact with the inner circumference Wa of the work W, but the expansion speed is still faster than the preset medium speed or the expansion speed in the final contact sensing process in the next step, and the sensitivity is high, and hence fluctuations of contact position detection (sensing) are large.

(C) Final Contact Sensing Process (Step 3)

After the preliminary contact sensing process, the servo motor for driving the depth of cut 16 moves the honing grindstones 10, 10, . . . at a preset low speed to a specified depth of cut (lower than the depth-cutting speed (medium speed) of the honing grindstones 10, 10, . . . in the preliminary contact sensing process (step 2)), and by the electrical information obtained from the operations of the servo motor for driving the spindle rotation 16 and the servo motor for driving the depth of cut 37, the contact state of the grinding surfaces 10a, 10a, . . . of the honing grindstones 10, 10, . . . with the inner circumference Wa of the work W is sensed at the final contact sensing sensitivity lower than the preliminary contact sensitivity of high precision (FIG. 6 (c)).

That is, in the final contact sensing process, the operation is basically same as in the preliminary contact sensing process, except that the depth-cutting speed (expansion speed) of the honing grindstones 10, 10, . . . is lower than in the preliminary contact sensing process, and that the sensitivity is lightly lower, thereby reducing the fluctuations of contact position detection (sensing).

In other words, in the preliminary contact sensing process, in order to prevent biting when the honing grindstones 10, 10, . . . contact with the work W, it was required to detect the contact earlier and the preliminary contact sensing was set at a high sensitivity, but the grindstone contact position detected in the final contact sensing process is to specify the reference start position in the subsequent processing process, and the depth-cutting speed of the honing grindstones 10, 10, is further slower than in the preliminary contact sensing process, and the contact sensitivity is slightly lowered while avoiding risk of biting when the honing grindstones 10, 10, . . . contact with the work W, and thereby fluctuations of the contact position sensing are reduced, and a uniform position detection is realized.

The process cycle of the grindstone contact sensing process (A)→(B)→(C) is shown in FIG. B.

The device control unit 7 controls the operation of drive units of the honing machine automatically by interlocking with each other, and is specifically composed of a microcomputer mainly having CPU, ROM, RAM, I/O port, and others.

The device control unit 7 stores a processing program for executing the honing process, and, as shown in FIG. 5, includes a main control unit 70, the spindle rotation control unit 61 for controlling the drive source of the spindle rotation drive unit 3, a spindle reciprocal control unit 71 for controlling the drive source of the spindle reciprocal drive unit 4, the grindstone depth-cutting control unit 62 for controlling the drive source of the grindstone depth-cutting unit 5, and the grindstone contact sensing control unit 60 of the grindstone contact sensing unit 6.

The main control unit 70 receives various information necessary for driving the drive sources of the drive units 3, 4, 5, for example, the rotating speed and elevating speed of the honing tool 1, or reference positions (stroke positions) P1, P2 of honing grindstones 10, 10, . . . , and stroke width S (see FIG. 2), or depth-cutting speed and depth-cutting timing, as numerical control data, or predetermined or selectively entered data by the keyboard of operation panel or the like, and receives such data or the sensing result from the grindstone contact sensing unit 6, and controls the control units 61, 62, 71.

These control units 61, 62, 71 have servo motors 16, 20, 37, and position detection sensors 63, 64, 73, and other drive units connected electrically, and the information of actual values obtained from them is compared with the various set values predetermined by the main control unit 70 and the grindstone contact sensing control unit 60, and the drive units 3, 4, 5 are driven and controlled according to the comparison result.

Figure 7:
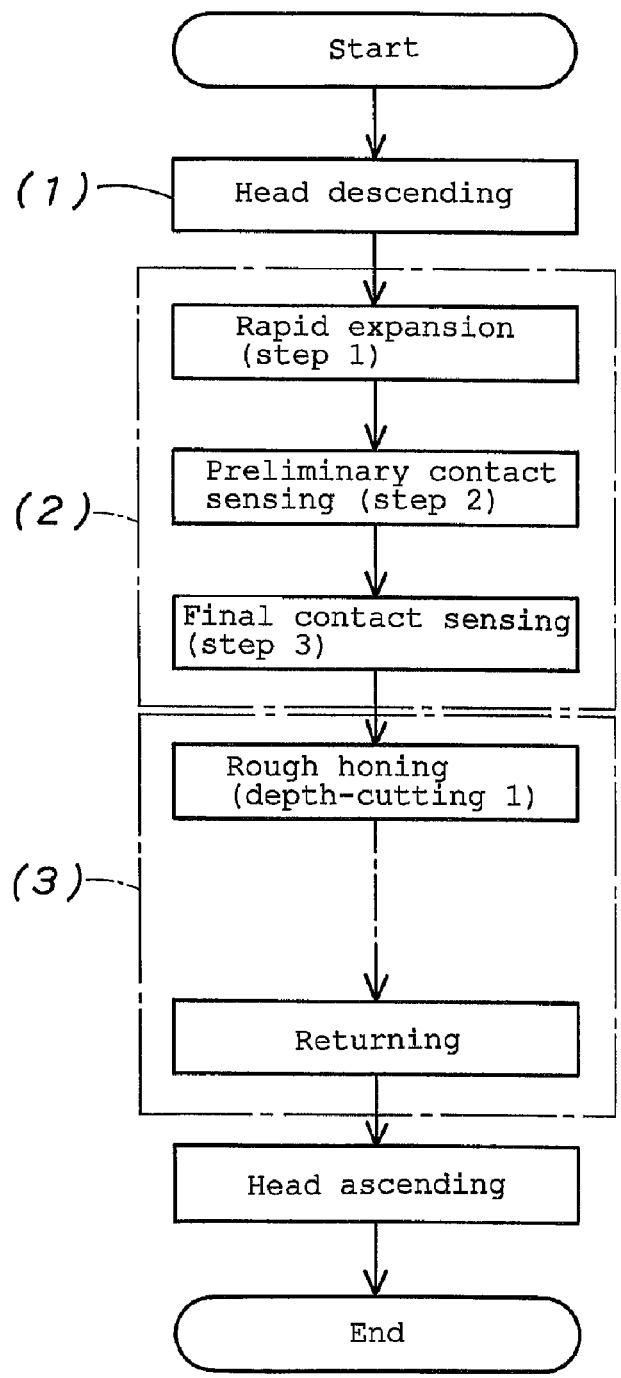
FIG. 7 is a flowchart of honing processing processes of the honing machine.

Therefore, in the honing machine having such configuration, the drive units 3, 4, 5 are controlled automatically by the device control unit 7 by interlocking with each other, and the inner circumference Wa of the work W supported on a work holding jig 80 is processed by honing by the honing tool 1 (honing processing method) as follows (see the flowchart in FIG. 7).

(1) Processing Start Process

By the drive motor 20 and the feed screw mechanism 19 of the spindle reciprocal drive unit 4, the rotary spindle 2 is lowered, and the honing tool 1 is moved by strokes to the stroke position for sensing the contact of the honing grindstones 10, 10, . . . with the work W, closely to the inner circumference Wa of the work W held on the work holding jig 60 (see FIG. 6 (a)).

(2) Grindstone Contact Sensing Process

After the processing start process, the grindstone contact sensing process starts. That is, (A) rapid expansion process (step 1)→(B) preliminary contact sensing process (step 2)→(C) final contact sensing process (step 3) are executed sequentially and continuously (see FIGS. 6 (b) to (c)), and the contact position of the grinding surfaces 10a, 10a, . . . of the honing grindstones 10, 10, . . . with the inner circumference Wa of the work W is detected.

(3) Processing Process

After the grindstone contact sensing process, the honing tool 1 rotated by the servo motor for driving the spindle rotation 16 is moved in reciprocal strokes in the axial line direction of the inner circumference Wa of the work W by the drive motor 20 and the feed screw mechanism 19, and the honing grindstones 10, 10, . . . of the honing tool 1 are moved to a specified depth of cut by reference to the contact position of the honing grindstones 10, 10, . . . with the work W sensed in the grindstone contact sensing process by the servo motor for driving the depth of cut 37 (specifically the contact position of the grinding surfaces 10a, 10a, . . . with the inner circumference Wa of the work W), and the inner circumference Wa of the work W is machined by the honing grindstones 10, 10, . . . .

Figure 8A:
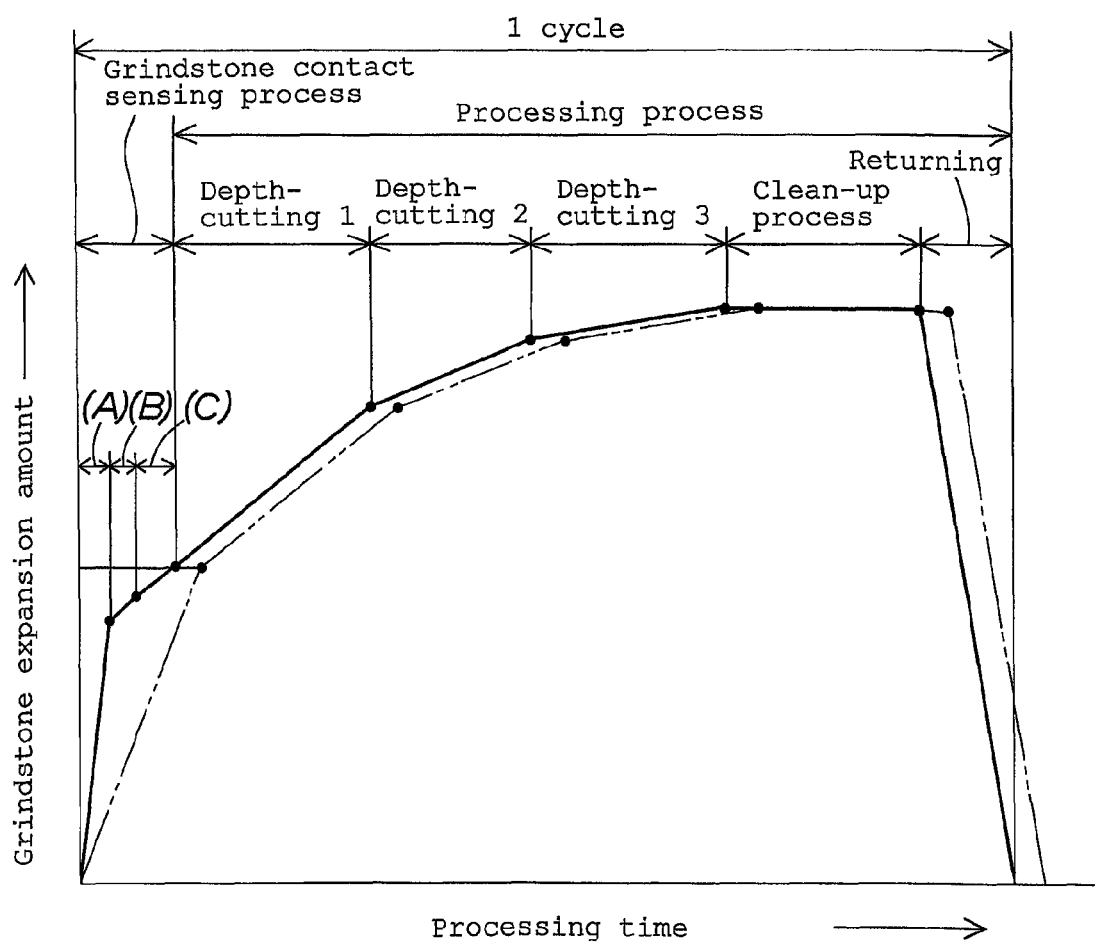
FIG. 8A is a diagram showing the honing processing cycles of the honing machine.
Figure 8B:
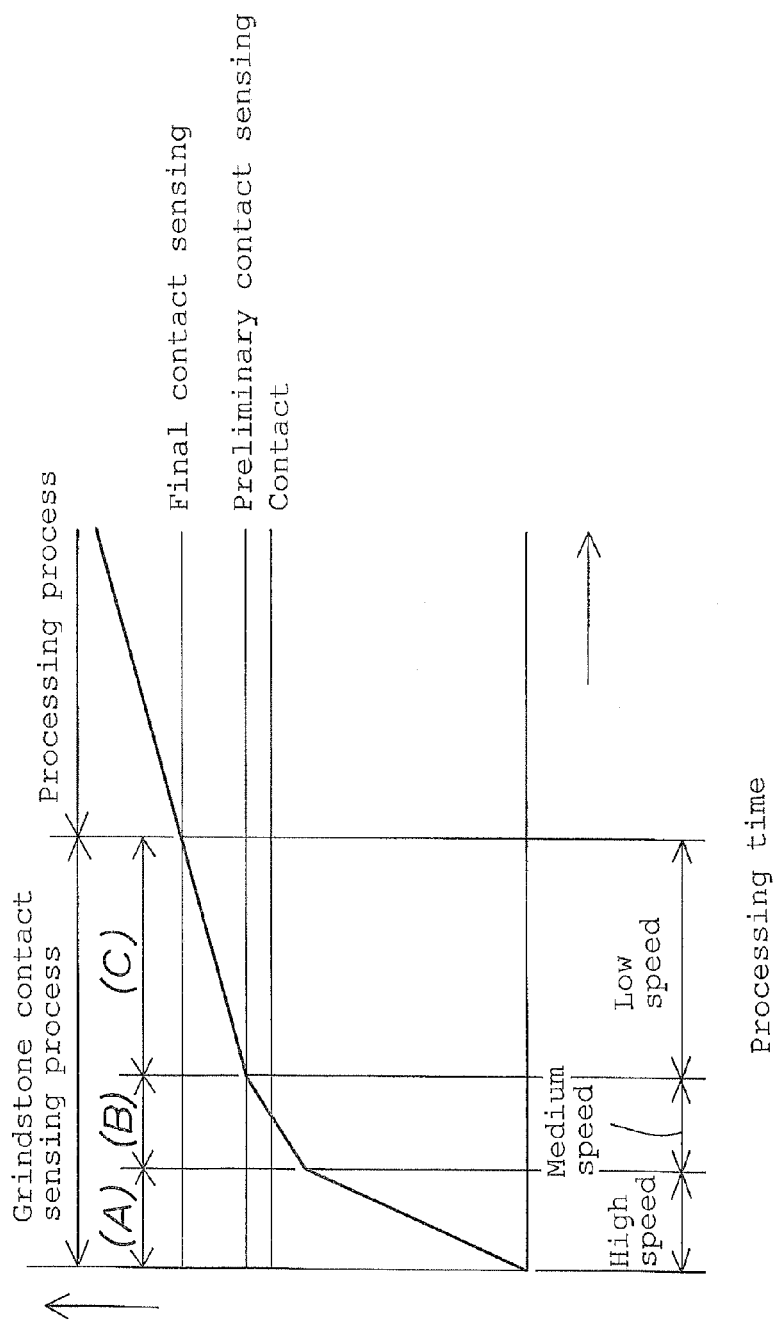
FIG. 8B is a diagram showing the grindstone contact sensing cycles in initial stage in the honing processing cycles.

In the illustrated preferred embodiment, this honing consists of three steps, as shown in FIG. 8A, that is, a rough honing process in which the depth of cut of the honing grindstones 10, 10, . . . is a large and rough depth of cut (depth-cutting process 1), a medium finishing honing process in which the depth of cut is a medium depth of cut (depth-cutting process 2), and a finish honing process in which the depth of cut is a small depth of cut (depth-cutting process 3), and when these three steps are finished (that is, when the depth of cut of the honing grindstones 10, 10, . . . corresponds to the preset value (finishing dimension) from the contact position), after the clean-up process of zero depth of cut, the return process causes to return and contract rapidly to the initial position, and thereby one cycle of honing process is finished.

(4) Processing Finishing Process

After one cycle of honing process 1, the rotary spindle 2 is elevated by the drive motor 20 and the feed screw mechanism 19 of the spindle reciprocal drive unit 4, and the honing tool 1 is elevated to return to the initial position, that is, the descending start position.

Thus, according to the grindstone contact sensing method of the preferred embodiment, the servo motor for driving the spindle rotation 16, and the servo motor for driving the depth of cut 37 are provided and used respectively as spindle rotation drive source for rotating and driving the rotary spindle 2 having the honing tool 1 and depth-of-cut drive source for moving the honing grindstones 10, 10, . . . at a specified depth of cut, and the contact position of the grinding surfaces 10a, 10a, . . . of the honing grindstones 10, 10, . . . of the honing tool 1 with the inner circumference Wa of the work W is sensed from various electrical information obtained from the operations of both the servo motors (rotating speed, torque, current value, stagnant pulses, etc.), and the contact position of the honing grindstones 10, 10, . . . with the inner circumference Wa of the work W can be sensed at high precision.

That is, in this grindstone contact sensing method, unlike the conventional similar sensing technology, the contact of the honing grindstones 10, 10, . . . with the work W can be sensed without newly adding a device or correcting the basic mechanical configuration.

Accordingly, the present invention realizes the matching process (aiming process) that is, the match honing process that is most noticed and expected recently in the honing processing technology (that is, the honing processing method for cutting how much from the contact position of the honing grindstone abutting against the inner circumference of the work, in which cutting amount (depth of cut from the contact position of honing grindstones 10, 10, . . . with the work W)=measured value−aimed value)).

Further, the grindstone contact sensing method is composed of three steps, that is, (a) a rapid expansion process for moving the honing grindstones 10, 10, . . . rapidly at a predetermined depth of cut by the servo motor for driving the depth of cut 37, while rotating the honing tool 1 by the servo motor for driving the spindle rotation 16 (step 1), (b) a preliminary contact sensing process, following the rapid expansion process, for moving the honing grindstones 10, 10, . . . at a depth of cut at a predetermined medium speed by the servo motor for driving the depth of cut 37, and sensing the contact state of the honing grindstones 10, 10, . . . with the inner circumference Wa of the work W from various electrical information (rotating speed, torque, current value, stagnant pulses, etc.) obtained from operations of the servo motor for driving the spindle rotation 1 and the servo motor for driving the depth of cut, at preliminary contact sensitivity of high precision (step 2), and (c) a final contact sensing process, following the preliminary contact sensing process, for moving the honing grindstones 10, 10, . . . at a depth of cut at a predetermined low speed by the servo motor for driving the depth of cut 37, and sensing the contact state of the honing grindstones 10, 10, . . . with the inner circumference Wa of the work W from various electrical information obtained from operations of the servo motor for driving the spindle rotation 16 and the servo motor for driving the depth of cut 37, at final contact sensitivity lower than the preliminary contact sensitivity (step 3), and therefore the contact of the honing grindstone with the inner circumference of the work can sensed at a very high precision Accordingly, in the high-precision honing process where the required finish precision is in the sub-micron unit, the contact position can be sensed also at high precision in sub-micron unit, and match honing process of high precision is realized.

Also according to the grindstone contact sensing method of the preferred embodiment, the grindstone projection adjustment, which was done manually in an early stage after replacing the honing grindstones 10, 10, . . . in the prior art, can be done automatically (automatic grindstone projection function).

That is, in the honing machine, when the honing grindstones 10, 10, . . . of the honing tool 1 are worn out over a specified limit, they are replaced with new honing grindstones 10, 10, . . . , and when replacing the honing grindstones 10, 10, 10, the initial grindstone projection is adjusted, and the reference position of the depth of cut of the honing grindstones 10, 10, . . . must be set and adjusted.

Conventionally, the grindstone projection was adjusted manually by a skilled worker by manipulating the grindstone projection adjusting handle, and the precision of adjustment depended on the skill and experience of the worker (the sense to detect contact of the honing grindstones 10, 10, . . . with the reference setting work W).

Also according to the grindstone contact sensing method of the present invention, the conventional manual truing operation of the honing grindstones 10, 10, . . . can be done automatically (grindstone truing function).

That is, the honing grindstones 10, 10, . . . are used and worn, and deformed, and run-out from the rotary spindle 2 occurs or the cylindricity is lowered, and correction is needed at specific intervals, which is known as truing, and conventionally the truing was manually practiced by a skilled worker by using truing jigs, such as truing block and truing sleeve, that is, the honing tool 1 is inserted into the truing jig with the honing grindstones 10, 10, . . . projected somewhat, and the grinding surfaces 10a, 10a, . . . of the honing grindstones 10, 10, . . . are polished while abutting against the truing surface, and same as in the grindstone projection adjustment, the truing precision depended on the skill and experience of the worker.

According to the grindstone contact sensing method of the preferred embodiment, the truing jig, for example, the truing sleeve is held in the honing machine, instead of the work W, and the projection of the honing grindstones 10, 10, . . . and rotation operation can be adjusted automatically by mechanical operation of the honing machine, and truing of high precision is executed stably and quickly without depending on the skill and experience of the worker.

According to the honing processing method of the preferred embodiment, the contact position of the honing grindstones 10, 10, . . . with the inner circumference Wa of the work W is detected by the grindstone contact sensing method, and by reference to this contact position, the inner circumference Wa of the work W is honed while controlling the depth of cut of the honing grindstones 10, 10, . . . , and the match honing process can be executed efficiently.

Moreover, in the starting stage of the honing processing method, the grindstone contact sensing method includes three steps, that is, at step 1, the honing tool 1 is rotated by the servo motor for driving the spindle rotation 16, and the honing grindstones 10, 10, . . . are moved rapidly at a predetermined depth of cut by the servo motor for driving the depth of cut 37, and by the action of the rapid expansion process for moving by the depth of cut, the idle time of the honing grindstones 10, 10, . . . not processing the work W, that is, the air-cut time can be shortened, and the cycle time (see solid line) in one cycle of honing process can be shortened as shown in FIG. 8A, as compared with the cycle time inn the conventional honing process (see double dot chain line).

Further, according to the grindstone contact sensing device (grindstone contact sensing unit) and the honing machine of the preferred embodiment applying the grindstone contact sensing technology mentioned above, the above effects are exhibited effectively, and the basic mechanical configuration of the conventional general honing machine can be directly utilized, and the honing machine capable of operating match honing process can be presented at low cost.

The foregoing preferred embodiment is a preferred example of the present invention, and the present invention is not limited to the illustrated preferred embodiment, but may be changed and modified freely within the scope of the present invention. For example, the following modifications may be realized.

The specific configuration of the basic components 3, 4, 5 of the honing machine may be modified as far as the same functions are assured.

In the illustrated preferred embodiment, the drive source of the spindle reciprocal drive unit 4 is a configuration of rotary drive system consisting of feed screw mechanism 19 and drive motor 20, but it may be also realized by a configuration of reciprocal drive system consisting of hydraulic cylinder and others for elevating and lowering the slide main body 18.

In the illustrated preferred embodiment, the electrical information to be monitored in the preliminary contact sensing process and final contact sensing process of the grindstone contact sensing process is selected from the spindle current value and the spindle rotating speed of the servo motor for driving the spindle rotation 16 and the expansion current value of the servo motor for driving the depth of cut 37 as mentioned above, but not limited to these items of information, at least these items of electrical information may be included, and other electrical information may be additionally used depending on the purpose.

Further, in the illustrated preferred embodiment, both the rotary spindle 1 and the depth-cutting drive shaft 42 are driven, controlled and monitored, and the contact of the honing grindstones 10, 10, . . . with the work W is detected, but depending on the purpose, either one may be driven, controlled and monitored, and this selection is executed by the monitoring information setting unit 65.

The processing process in the honing processing method of the illustrated preferred embodiment consists of three steps, that is, the rough honing process (depth-cutting process 1), medium finish honing process (depth-cutting process 2), and finish honing process (depth-cutting process 3), but the specific configuration of the processing process may be designed and changed freely depending on the purpose.

The grindstone contact sensing method and device of the present invention are not limited to the honing process in the illustrated preferred embodiment, but may also applied in other machine tools having the grinding and cutting mechanisms.

Having described the preferred embodiment of the present invention with reference to the accompanying drawings, it is to be understood that the present invention is not limited to the preferred embodiment alone, and that various changes and modifications may be effected therein by those skilled in the art without departing from the scope or true spirit of the present invention as defined in the appended claims.

What is claimed is:

1. A grindstone contact sensing method of sensing the contact of the honing grindstone with the inner circumference of the work in a honing machine for honing an inner circumference of a work by moving the honing tool provided with a honing grindstone reciprocally in the direction of the axial line of the inner circumference of the work, rotating about the axial line, and moving the honing grindstone at a specified depth of cut by mechanical driving means, wherein a servo motor for driving the spindle rotation, and a servo motor for driving the depth of cut are provided and used respectively as a spindle rotation drive source for rotating and driving the spindle having the honing tool and a depth-of-cut drive source for moving the honing grindstone at a specified depth of cut, and the contact position of the honing grindstone with the inner circumference of the work is sensed from various electrical information obtained from both the servo motors.

2. The grindstone contact sensing method of claim 1, comprising the following steps:
(a) a rapid expansion process for moving the honing grindstone rapidly at a predetermined depth of cut by the servo motor for driving the depth of cut, while rotating the honing tool by the servo motor for driving the spindle rotation,
(b) a preliminary contact sensing process, following the rapid expansion process, for moving the honing grindstone at a depth of cut at a predetermined medium speed by the servo motor for driving the depth of cut, and sensing the contact state of the honing grindstone with the inner circumference of the work from various electrical information obtained from operations of the servo motor for driving the spindle rotation and the servo motor for driving the depth of cut, at preliminary contact sensitivity of high precision, and
(c) a final contact sensing process, following the preliminary contact sensing process, for moving the honing grindstone at a depth of cut at a predetermined low speed by the servo motor for driving the depth of cut, and sensing the contact state of the honing grindstone with the inner circumference of the work from various electrical information obtained from operations of the servo motor for driving the spindle rotation and the servo motor for driving the depth of cut, at final contact sensitivity lower than the preliminary contact sensitivity.

3. The grindstone contact sensing method of claim 2, wherein the electrical information in the preliminary contact sensing process and the final contact sensing process includes at least the spindle current value and spindle rotating speed of the servo motor for driving the spindle rotation and the expansion current value of the servo motor for driving the depth of cut.

4. A honing processing method of honing the inner circumference of the work by moving the honing tool provided with a honing grindstone reciprocally in the direction of the axial line of the inner circumference of the work, rotating about the axial line, moving the honing grindstone at a specified depth of cut by mechanical driving means, and honing the inner circumference of the work, wherein a servo motor for driving the spindle rotation, and a servo motor for driving the depth of cut are provided and used respectively as a spindle rotation drive source for rotating and driving the spindle having the honing tool and a depth-of-cut drive source for moving the honing grindstone at a specified depth of cut, and the contact position of the honing grindstone with the inner circumference of the work is sensed from various electrical information obtained from both the servo motors, and on the basis of this contact position, the inner circumference of the work is honed while controlling the depth of cut of the honing grindstone.

5. The honing processing method of claim 4, wherein the method of sensing the contact position of the honing grindstone with the inner circumference of the work comprises the following processes:
(a) a rapid expansion process for moving the honing grindstone rapidly at a predetermined depth of cut by the servo motor for driving the depth of cut, while rotating the honing tool by the servo motor for driving the spindle rotation,
(b) a preliminary contact sensing process, following the rapid expansion process, for moving the honing grindstone at a depth of cut at a predetermined medium speed by the servo motor for driving the depth of cut, and sensing the contact state of the honing grindstone with the inner circumference of the work from various electrical information obtained from operations of the servo motor for driving the spindle rotation and the servo motor for driving the depth of cut, at preliminary contact sensitivity of high precision, and
(c) a final contact sensing process, following the preliminary contact sensing process, for moving the honing grindstone at a depth of cut at a predetermined low speed by the servo motor for driving the depth of cut, and sensing the contact state of the honing grindstone with the inner circumference of the work from various electrical information obtained from operations of the servo motor for driving the spindle rotation and the servo motor for driving the depth of cut, at final contact sensitivity lower than the preliminary contact sensitivity.

6. The honing processing method of claim 5,
wherein the electrical information in the preliminary contact sensing process and the final contact sensing process includes at least the spindle current value and spindle rotating speed of the servo motor for driving the spindle rotation and the expansion current value of the servo motor for driving the depth of cut.

7. The honing processing method of claim 4, further comprising the following processes:
(1) a processing start process for moving the honing tool by strokes to a stroke position for sensing the contact of the honing grindstone with the work,
(2) a grindstone contact sensing process, following the processing start process, for executing the grindstone contact sensing method, and
(3) a honing process, following the grindstone contact sensing process, for moving the rotating honing tool in reciprocal strokes in the direction of axial line of the inner circumference of the work, controlling the depth of cut of the honing grindstone on the basis of the contact position of the honing grindstone detected at the grindstone contact sensing process, and honing the inner circumference of the work by the honing grindstone.

8. A grindstone contact sensing device installed in a honing machine for moving the honing tool provided with a honing grindstone reciprocally in the direction of the axial line of the inner circumference of the work, rotating about the axial line, moving the honing grindstone at a specified depth of cut by mechanical driving means, and honing the inner circumference of the work, for sensing the contact of the honing grindstone with the inner circumference of the work, comprising:
  a servo motor for driving the spindle rotation for rotating and driving the rotary spindle having the honing tool,
  a servo motor for driving the depth of cut for moving the honing grindstone at a depth of cut, and
  contact sensing means for monitoring various electrical information obtained from the operations of both the servo motor, and sensing the contact position of the grinding stone with the inner circumference of the work from the monitoring result.

9. The grindstone contact sensing device of claim 8, wherein the contact sensing means is designed to execute the following processes:
  (a) a rapid expansion process for moving the honing grindstone rapidly at a predetermined depth of cut by the servo motor for driving the depth of cut, while rotating the honing tool by the servo motor for driving the spindle rotation,
  (b) a preliminary contact sensing process, following the rapid expansion process, for moving the honing grindstone at a depth of cut at a predetermined medium speed by the servo motor for driving the depth of cut, and sensing the contact state of the honing grindstone with the inner circumference of the work from various electrical information obtained from operations of the servo motor for driving the spindle rotation and the servo motor for driving the depth of cut, at preliminary contact sensitivity of high precision, and
  (c) a final contact sensing process, following the preliminary contact sensing process, for moving the honing grindstone at a depth of cut at a predetermined low speed by the servo motor for driving the depth of cut, and sensing the contact state of the honing grindstone with the inner circumference of the work from various electrical information obtained from operations of the servo motor for driving the spindle rotation and the servo motor for driving the depth of cut, at final contact sensitivity lower than the preliminary contact sensitivity.

10. The grindstone contact sensing device of claim 9, wherein the electrical information in the preliminary contact sensing process and the final contact sensing process includes at least the spindle current value and spindle rotating speed of the servo motor for driving the spindle rotation and the expansion current value of the servo motor for driving the depth of cut.

11. The grindstone contact sensing device of claim 8, further comprising:
  monitoring information setting means for selecting and setting the electrical information to be monitored by the contact sensing means, from plural types of electrical information of the servo motor.

12. The grindstone contact sensing device of claim 8, wherein the electrical information includes at least the spindle current value and spindle rotating speed of the servo motor for driving the spindle rotation, and the expansion current value of the servo motor for driving the depth of cut.

13. A honing machine comprising:
  a rotary spindle movable reciprocally in the direction of axial line of the inner circumference of the work, and supported rotatably about the axial line,
  spindle rotating means for rotating and driving the rotary spindle about the axial line,
  spindle reciprocating means for moving the rotary spindle reciprocally in the direction of axial line of the inner circumference,
  a honing tool attached to the leading end of the rotary spindle, and expansively having a honing grindstone having a grinding surface along the inner circumference,
  grindstone depth-cutting means for moving the honing grindstone of the honing tool at a specified depth of cut,
  grindstone contact sensing means for sensing the contact of the honing grindstone with the inner circumference of the work, and
  control means for controlling automatically by mutually interlocking the operations of the spindle rotating means, spindle reciprocating means and grindstone depth-cutting means, by receiving the sensing result from the grindstone contact sensing means,
  wherein the grindstone contact sensing means includes a servo motor for driving the spindle rotation for composing the spindle rotating means, a servo motor for driving the depth of cut for composing the grindstone depth-cutting means, and contact sensing means for monitoring various electrical information obtained from the operations of both the servo motor, and sensing the contact position of the grindingstone with the inner circumference of the work from the monitoring result.

14. The honing machine of claim 13, further comprising:
  monitoring information setting means for selecting and setting the electrical information to be monitored by the contact sensing means, from plural types of electrical information of the servo motor.

15. The honing machine of claim 13, wherein the electrical information includes at least the spindle current value and spindle rotating speed of the servo motor for driving the spindle rotation, and the expansion current value of the servo motor for driving the depth of cut.

* * * * *